No. 729,612. PATENTED JUNE 2, 1903.
P. LASSEN.
PLOW.
APPLICATION FILED DEC. 27, 1902.
NO MODEL. 2 SHEETS—SHEET 1.
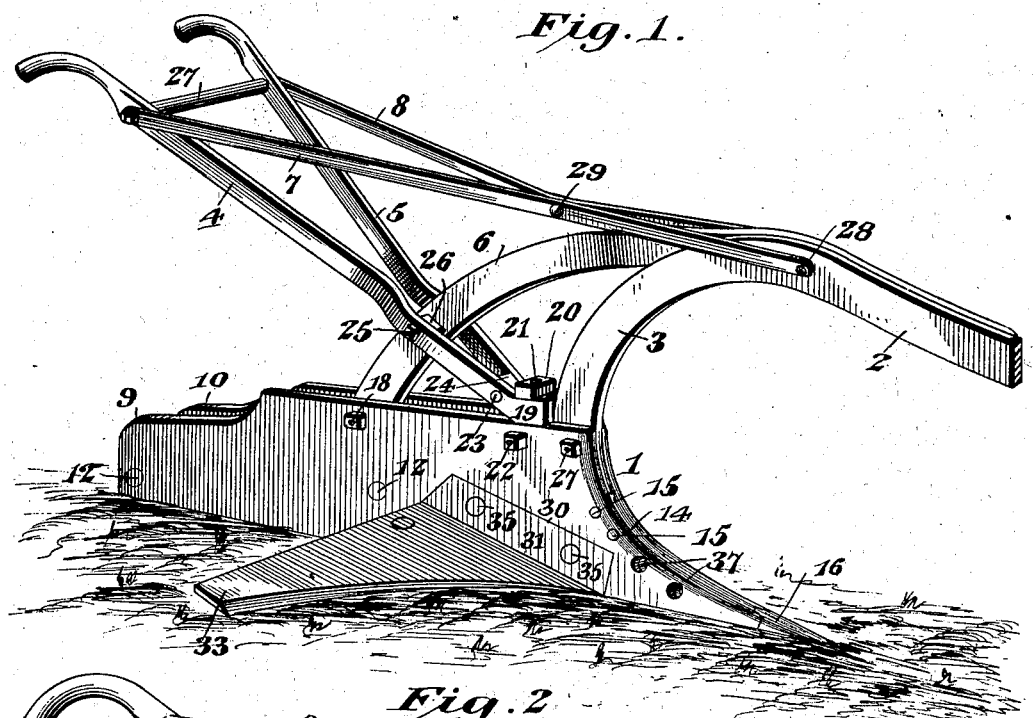
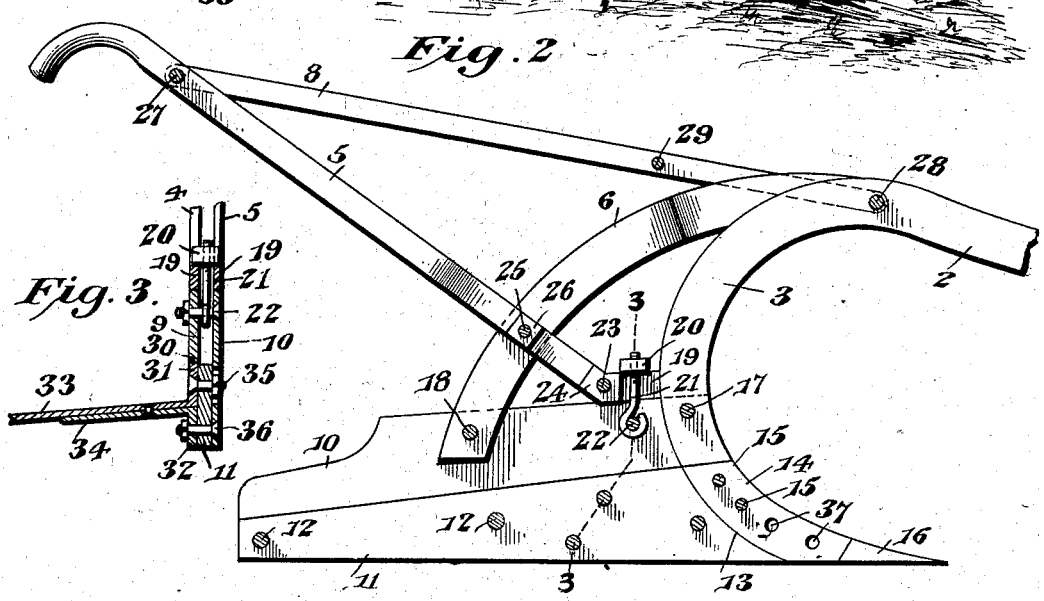
Peter Lassen, Inventor

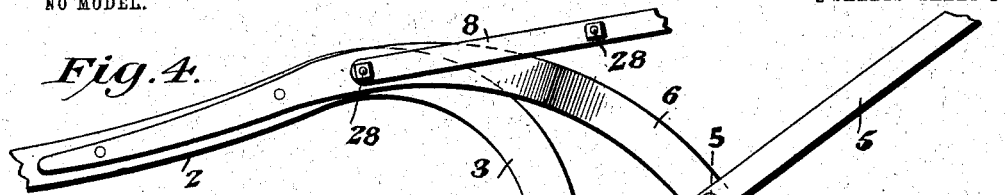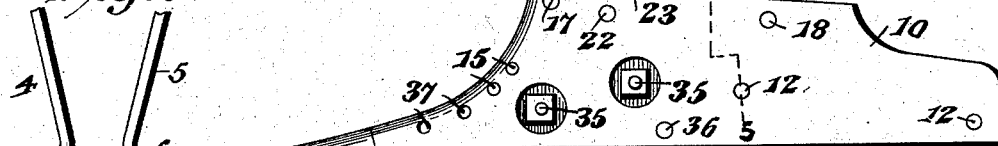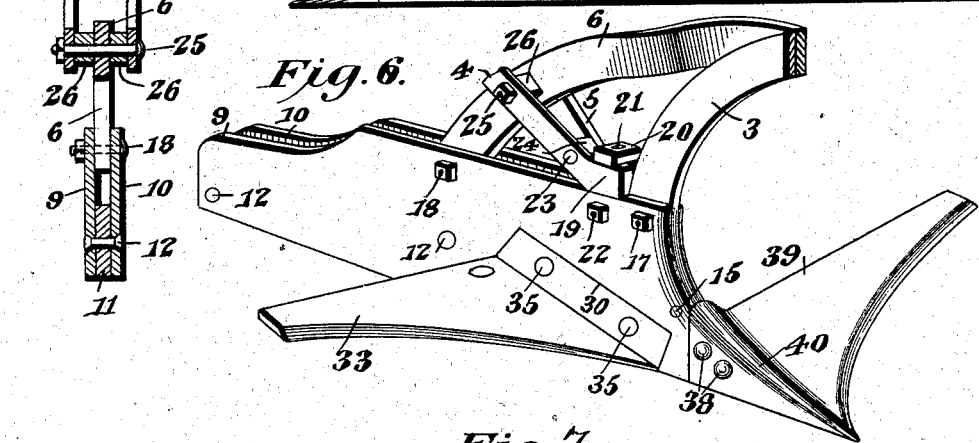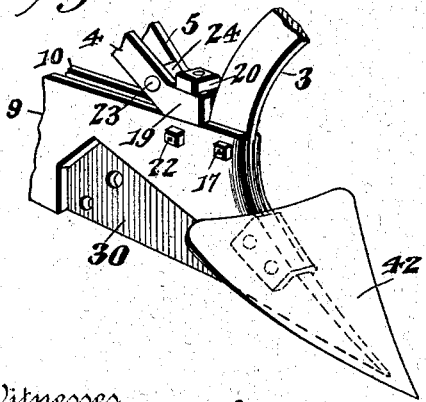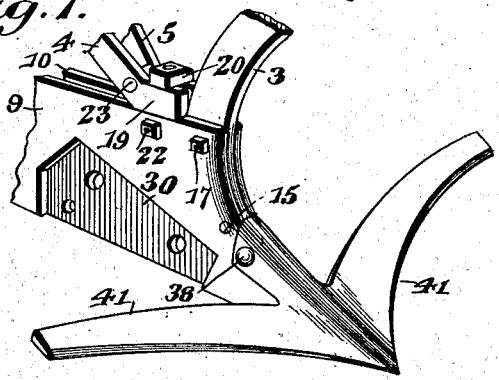

No. 729,612. Patented June 2, 1903.

UNITED STATES PATENT OFFICE.

PETER LASSEN, OF WETMORE, TEXAS.

PLOW.

SPECIFICATION forming part of Letters Patent No. 729,612, dated June 2, 1903.

Application filed December 27, 1902. Serial No. 136,845. (No model.)

*To all whom it may concern:*

Be it known that I, PETER LASSEN, a citizen of the United States, residing at Wetmore, in the county of Bexar and State of Texas, have invented a new and useful Plow, of which the following is a specification.

This invention relates to a novel stalk-plow, the object being to produce a simple, inexpensive, and durable implement for plowing out stalks, particularly cotton-stalks, without turning the ground or covering the stalks, and arranged to prevent the stalks from being precipitated in front of the standard, and thereby impeding the movement of the plow.
Subordinate to this general object is the provision of means for attaching blades of different forms to a stock to equip the plow for different kinds of work.

To the accomplishment of the objects stated and others subordinate thereto, the invention in its preferred embodiment resides in the features of construction and arrangement to be hereinafter described, illustrated in the accompanying drawings, and succinctly defined in the appended claims.

In said drawings, Figure 1 is a perspective view of my plow with the front end of the beam broken away. Fig. 2 is a longitudinal sectional view thereof. Fig. 3 is a transverse section on the line 3 3 of Fig. 2. Fig. 4 is a side elevation, looking from the side of the plow opposite to that shown in Fig. 1, with parts broken away. Fig. 5 is a section on the line 5 5 of Fig. 4. Fig. 6 is a perspective view with parts broken away and showing an extra blade attached to the plow-point. Fig. 7 is a fragmentary perspective view showing a double sweep attached to the stock, and Fig. 8 is a similar view with a shovel-blade attached.
Like numerals of reference are employed to designate corresponding parts throughout the several views.

The plow includes a frame 1; a beam 2, having its rear end bent down to form a standard 3; handles 4 and 5; a beam-brace 6, curved longitudinally and attached at its rear ends to the frame and beam, respectively, and handle-braces 7 and 8, connected to the beam and handles.

The frame 1 is composed of a pair of metal side plates 9 and 10, disposed edgewise to the ground and spaced apart by what may be termed a "sole-plate" 11, secured in place by bolts or rivets 12, passed through both side plates and the intermediate sole-plate. The plate 11 is of considerably-less height than the side plates and is of tapering form, its front edge 13 being curved, as shown in Fig. 2, and located somewhat in rear of the curved front edge of the frame. This arrangement of the sole-plate permits it to constitute a backing for a longitudinally-curved plow-point 14, secured between the front ends of the side plates by rivets 15 and having a hard-steel extremity 16, welded or otherwise rigidly associated with the plow-point and sharpened to constitute the point proper of the plow. The front edge of the frame, formed by the front edges of the side plates and of the plow-point, is transversely curved, as shown, and as the side plates are dressed down to cause the opposite sides of the frame to taper gradually to the extremity of the point they terminate somewhat in rear of such extremity, so that the point proper of the plow is formed by the protruding hard-steel portion 16. The upper end of the point 14 is seated against the lower end of the standard 3, said end being between the side plates and secured by a bolt 17. By this arrangement the point 14 may be readily removed for the purpose of replacement in the event of injury thereto, but when in position is firmly seated between the side plates and is braced by the sole-plate and the standard 3, great durability of the structure being thus attained. The lower end of the beam-brace 5, like the lower end of the standard, is received between the side plates and secured by a bolt 18, its front end extending along one side of and serving to stiffen the beam 2. The brace 6 may be secured to the beam in any suitable manner—as, for instance, by rivets, as shown; but in order that its lower end may be disposed directly behind the beam the front end of the brace is laterally offset, as best shown in Fig. 6.

The means for attaching the handles to the frame may be varied within wide limits; but by preference their front ends 19 rest upon the upper edges of the side plates in rear of the standard and are clamped by a nut 20, screwed upon the upper end of a hook-bolt 21, the hook of which is passed under the bolt 22, extending between the side plates at a point above the sole-plate 11. (See Figs. 2 and 3.) The handles are connected adjacent to their front ends by a bolt 23, passing through said ends and through an intermediate block 24, and said handles are secured to the beam 6 by a bolt 25, passing through the handles and beam and through blocks 26, interposed between the handles and the opposite sides of the beam. It may be noted at this point that if it is desired to shift the handles to one side or the other this may be done by removing the bolt 25 and by placing both of the spacing-blocks 26 between the beam and one of the handles, the bolt being then replaced and the parts drawn into position. Adjacent to their upper rear ends the handles are connected by a cross-bar 27, the outer ends of which are in turn secured to the rear ends of the handle-braces 7 and 8. These braces are secured at their front ends by a bolt 28, which passes through the beam and the beam-brace, and at a point intermediate of their ends the braces are drawn together by a bolt or rivet 29, which serves to prevent said braces from interfering with the stalks as the latter are being plowed out.

The side plate 9 is cut out to form an opening 30 for the reception of the foot-flanges 31 and 32 of a laterally-extending blade 33, the flange 31 being preferably integral with the blade and the flange 32 being integral with a reinforcing-plate 34, secured to the under side of the blade, but of considerably-smaller size than the same. These flanges are seated flat against the side of the sole-plate 11 exposed before the opening 30 and have their outer faces flush with the outer face of the side plate 9. The edges of the flanges engage the edges of the plate 9 defining the opening, and the blade is secured in place by bolts 35 and 36, passed through the flanges, the sole-plate 11, and the side plate 10. (See Fig. 3.)

The structure thus far described comprehends a complete embodiment of my invention in one aspect thereof, it being observed that as the plow is drawn across the field the blade 33 will plow up the stalks, which latter will have passed beyond the standard before being loosened, and will therefore be prevented from bunching or tangling in advance of the standard and under the beam. This form of plow is what is known as a "half-sweep," and in Fig. 6 I have shown the plow organized as a double half-sweep. To enable the plow to be thus converted, the frame is provided adjacent to its front edge with a pair of bolt-holes 37 for the reception of the securing-bolts 38 of a half-sweep blade 39. This blade is designed to extend beyond the side of the plow opposite the blade 33 and is formed at one end with a socket 40, which fits over the plow-point, as shown. If desired, the blade 33 may be entirely removed, as shown in Fig. 7, and a sweep-blade 41 may be secured to the plow-point, as shown, or the plow may be equipped with a shovel-blade 42, as shown in Fig. 8.

It is thought that from the foregoing the construction and arrangement of my plow will be clearly understood, but while the illustrated embodiments of the invention are thought at this time to be preferable I wish to be distinctly understood as reserving to myself the right to effect such changes, modifications, and variations of the illustrated structure as may be fairly embraced within the scope of the protection prayed.

What I claim is—

1. In a plow, the combination with a frame including a pair of side plates and an intermediate sole-plate, of a plow-point, a blade and a beam associated with said frame, said plow-point being retained between the side plates.

2. In a plow, the combination with a frame composed of side plates, an intermediate sole-plate and a point, of a blade secured to the frame and extending laterally therefrom, and a beam and handles secured to the frame.

3. In a plow, the combination with a pair of side plates, an intermediate sole-plate, and a point backed by the sole-plate, of a laterally-extending blade, and a beam and handles secured to the side plates.

4. In a plow, the combination with a pair of side plates, an intermediate sole-plate, a beam, and a standard having one end secured between the side plates, of a plow-point located intermediate of the side plates and braced by the sole-plate and standard.

5. In a plow, the combination with a pair of side plates, an intermediate sole-plate, and a beam having one end bent to form a standard secured between the side plates, of a plow-point secured between the side plates and backed by the sole-plate and standard, and a blade extending laterally in rear of the point.

6. In a plow, the combination with a frame comprising side plates, a sole-plate and a point, of a blade secured to and extending laterally from the frame in rear of the point.

7. In a plow, the combination with a frame comprising side plates, a sole-plate and a point, one of said side plates having an opening, of a blade having a foot-flange seated in the opening and secured to the sole-plate.

8. In a plow, the combination with a pair of side plates, an intermediate sole-plate, a beam, and a standard having one end secured between the side plates, one of said side plates being provided with an opening, of a point secured between the front ends of the side plates and having its rear and upper edges seated against the front end of the sole-plate and the lower end of the standard respectively, and a blade having a foot-flange seated in the opening in the side plate and secured to the sole-plate.

9. In a plow, the combination with a frame and beam, of a blade provided with a foot-flange, and a reinforcing-plate secured to the under side of the blade and likewise provided with a foot-flange, said foot-flanges being bolted to the frame.

10. In a plow, the combination with a frame including a pair of side plates one of which is apertured, a sole-plate and a point, of a blade provided with a foot-flange, a reinforcing-plate secured to the under side of the blade and also having a foot-flange, both of said foot-flanges being received within the opening in the side plate, and means for securing each of the flanges to the sole-plate.

11. In a plow, the combination with a frame comprising side plates, a sole-plate and a point, of a blade extending laterally from the frame, a beam, a standard extended from the beam and secured between the side plates, and a beam-brace secured at one end to the beam and having its other end secured between the side plates.

12. In a plow, the combination with a frame including side plates, a point and a blade, of a beam, a standard and a beam-brace both secured between the side plates, and handles secured to the side plates and beam-brace respectively.

13. In a plow, the combination with a frame provided with a point and blade, of a beam, a standard extending from the beam and secured to the frame, a beam-brace secured to the frame and beam respectively, handles secured to the frame and beam-brace, and handle-braces extending between the handles and the beam.

14. In a plow, the combination with a frame including a pair of side plates and a point, of a beam having a standard secured to the frame, a transverse bolt carried by the frame, handles, a hook-bolt engaging the first-named bolt and provided with a nut for clamping the handles to the frame, and braces extending between the handles and beam.

15. In a plow, the combination with a pair of side plates, one of which is apertured, a sole-plate, and a plow-point secured between the side plates and backed by the sole-plate, of a beam having a standard bolted between the side plates and opposed to the upper end of the point, a blade having foot-flanges located within the opening of the apertured side plate and bolted to the sole-plate, a beam-brace secured at one end to the beam and having its opposite end bolted between the side plates, handles having connection with the side plates and beam-brace respectively, and handle-braces extending between the ends of the handles and the beam.

In testimony that I claim the foregoing as my own I have hereto affixed my signature in the presence of two witnesses.

PETER LASSEN.

Witnesses:
 FANNIE PERRIN,
 GUSTAV BRANDT.